US012586498B2

(12) United States Patent
Maier et al.

(10) Patent No.: US 12,586,498 B2
(45) Date of Patent: Mar. 24, 2026

(54) DISPLAY APPARATUS

(71) Applicant: TriLite Technologies GmbH, Vienna (AT)

(72) Inventors: Franz Josef Maier, Poertschach am Woerthersee (AT); Faraj Nassar, Vienna (AT); Gerhard Schmid, Waldkirchen (AT); Johannes Wolkerstorfer, Graz (AT); Christopher Dissauer-Eberl, Graz (AT)

(73) Assignee: TriLite Technologies GmbH, Vienna (AT)

(*) Notice: Subject to any disclaimer, the term of this patent is extended or adjusted under 35 U.S.C. 154(b) by 0 days.

(21) Appl. No.: 18/749,742

(22) Filed: Jun. 21, 2024

(65) Prior Publication Data

US 2024/0428712 A1 Dec. 26, 2024

(30) Foreign Application Priority Data

Jun. 22, 2023 (EP) .................................... 23180876

(51) Int. Cl.
*G09G 3/02* (2006.01)

(52) U.S. Cl.
CPC ....... *G09G 3/02* (2013.01); *G09G 2340/0435* (2013.01); *G09G 2360/18* (2013.01)

(58) Field of Classification Search
CPC ............. G09G 3/02; G09G 2340/0435; G09G 2360/18; H04N 9/3179; H04N 9/3135
See application file for complete search history.

(56) References Cited

U.S. PATENT DOCUMENTS 5,715,021 A 2/1998 Gibeau et al.
5,774,174 A 6/1998 Hardie
(Continued)

FOREIGN PATENT DOCUMENTS

CN 109752839 A 5/2019
GB 2457155 A 8/2009
(Continued)

OTHER PUBLICATIONS

Extended European Search Report received for European Patent Application No. 23180876.7, mailed on Dec. 11, 2023, 14 pages.
(Continued)

*Primary Examiner* — Temesghen Ghebretinsae
*Assistant Examiner* — Karin Kiyabu
(74) *Attorney, Agent, or Firm* — Weaver IP L.L.C.

(57) ABSTRACT

A display apparatus comprises a light source configured to emit a light beam, a light source driver configured to drive the light source according to pixels of an image frame, a mirror assembly with one or more mirrors configured to oscillate and deflect the light beam according to a scan pattern, a mirror driver configured to drive the mirror assembly according to said scan pattern, a buffer configured to buffer pixels and feed, synchronised by the mirror driver one or more times, the buffered pixels successively to the light source driver, and a central processing unit configured to determine a sequence of pixels of the image frame to be successively displayed according to said scan pattern, and to transfer said sequence to the buffer.

19 Claims, 8 Drawing Sheets

(56) References Cited

U.S. PATENT DOCUMENTS

Figure 1:
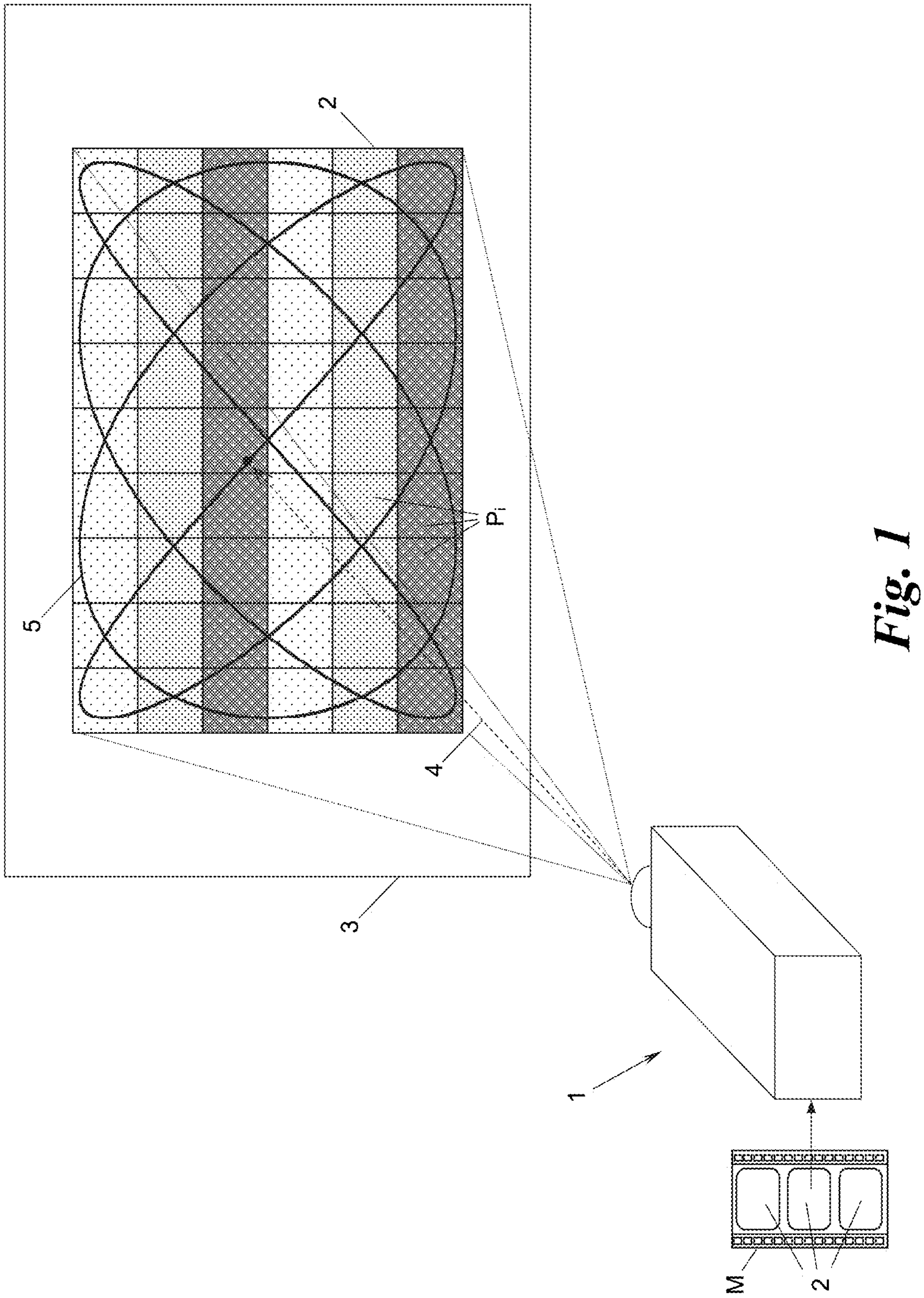

| | | | | |
|---|---|---|---|---|
| 6,373,495 | B1 * | 4/2002 | Lin | G06T 15/04 345/428 |
| 7,289,169 | B2 | 10/2007 | Suk | |
| 8,783,874 | B1 | 7/2014 | Riza | |
| 8,933,915 | B2 * | 1/2015 | Peng | G09G 3/20 345/545 |
| 10,043,490 | B2 * | 8/2018 | Morein | G09G 5/36 |
| 10,288,990 | B1 | 5/2019 | Ratti et al. | |
| 12,452,439 | B2 * | 10/2025 | Maier | H04N 9/3185 |
| 2008/0136742 | A1 * | 6/2008 | Tegreene | G02B 27/0031 345/7 |
| 2009/0051828 | A1 | 2/2009 | Brown et al. | |
| 2010/0208148 | A1 | 8/2010 | Deppe | |
| 2012/0127184 | A1 | 5/2012 | Satoh et al. | |
| 2012/0275697 | A1 | 11/2012 | Mcdowell et al. | |
| 2014/0126590 | A1 | 5/2014 | Kimura | |
| 2016/0044290 | A1 | 2/2016 | Morimoto | |
| 2018/0227540 | A1 | 8/2018 | Stolitzka | |
| 2018/0308458 | A1 | 10/2018 | Hall | |
| 2021/0210031 | A1 | 7/2021 | Kang | |
| 2022/0326594 | A1 | 10/2022 | Smits | |
| 2023/0370574 | A1 * | 11/2023 | Blicharski | G02B 26/0833 |
| 2024/0428713 | A1 * | 12/2024 | Maier | H04N 9/3182 |
| 2024/0430390 | A1 * | 12/2024 | Maier | H04N 9/3182 |
| 2024/0430456 | A1 | 12/2024 | Maier et al. | |

FOREIGN PATENT DOCUMENTS

| | | | |
|---|---|---|---|
| WO | 2019/143525 | A1 | 7/2019 |
| WO | 2022/100847 | A1 | 5/2022 |

OTHER PUBLICATIONS

Extended European Search Report received for European Patent Application No. 23180877.5, mailed on Dec. 7, 2023, 9 pages.
Extended European Search Report received for European Patent Application No. 23196195.4, mailed on Mar. 11, 2024, 8 pages.
Extended European Search Report received for European Patent Application No. 23214645.6, mailed on May 22, 2024, 11 pages.
Non-Final Office Action received for U.S. Appl. No. 18/750,182, mailed on Jul. 16, 2025, 13 pages.
Notice of Allowance received for U.S. Appl. No. 18/749,745, mailed on Jun. 30, 2025, 27 pages.

* cited by examiner

DISPLAY APPARATUS

CROSS-REFERENCE TO RELATED APPLICATIONS

This application claims priority to European Patent Application No. 23 180 876.7 filed Jun. 22, 2023, the disclosure of which is incorporated herein by reference.

TECHNICAL FIELD

The present disclosed subject matter relates to a display apparatus comprising a light source configured to emit a light beam, a light source driver configured to drive the light source according to pixels of an image frame to be displayed on an image area within a frame duration, a mirror assembly with one or more mirrors configured to oscillate and deflect the light beam towards the image area according to a scan pattern, and a mirror driver configured to drive the mirror assembly according to said scan pattern.

BACKGROUND

Display apparatus are commonly used in virtual reality (VR) or augmented reality (AR) glasses, helmets or head-up displays (HUDs) for a broad range of applications like navigation, training, entertainment, education or work. A light source driver drives a light source to emit a mono- or multicoloured light beam carrying an image (frame) comprised of pixels onto a mirror assembly having one or more moving micro-electro-mechanical-system (MEMS) mirrors driven by a mirror driver. The mirror assembly has, e.g., one MEMS mirror oscillating about two axes or two MEMS mirrors each oscillating about a respective axis, to deflect the light beam into subsequent directions (angles) towards an image area, one direction (angle) per pixel of the image. In the following a mirror assembly having one single mirror is described, however, the following applies as well to a mirror assembly having more than one mirror.

In raster scanning, the mirror oscillates fast about a vertical axis and slowly about a horizontal axis to sweep the directions and, thus, scans the light beam over the pixels of the image area column by column and line by line. For the fast axis oscillation, the mirror can be driven in resonance with the natural harmonics of its articulation. However, for the slow sweep about its other axis the mirror needs to be forcedly driven against its resonance frequency, which either requires more power and a larger drive system or limits the scanning speed and hence the per-pixel refresh rate and frame rate (which is the inverse of the frame duration).

To overcome these miniaturisation and speed limits of raster scanning, other scan patterns may be employed. For instance, in so-called Lissajous scanning the mirror is driven according to a Lissajous pattern to oscillate resonantly—or near resonance—about both axes. The frequencies of oscillation about the two axes are greater than the frame rate and the beginnings of their respective oscillation periods usually meet only every one or more frames. In this way, each image frame is "painted" with the very complex, "dense" Lissajous pattern on the image area.

With Lissajous scanning, higher speeds of the light beam along the Lissajous pattern and hence higher frame rates can be achieved with low driving powers and small actuators because of exploiting the resonance of the MEMS mirror. However, current Lissajous scanners still suffer from a complex and slow synchronisation of the light source driver with the mirror assembly movement via a frame buffer that stores the image frame and feeds the light source driver with pixels. To synchronise the pixel feeding with the MEMS mirror position, the mirror driver periodically provides a synchronisation signal indicating the current mirror position within the Lissajous pattern to the frame buffer. The frame buffer identifies the currently needed pixel in the image frame for the indicated mirror position, retrieves that pixel from the frame buffer and feeds the same to the light source driver. While this setup ensures that each pixel provided to the light source driver matches the current MEMS mirror position, the buffer requires a high processing power for identifying the currently needed pixel and accessing the memory locations in the buffer that are scattered according to the Lissajous pattern.

As a result, the pixel feeding rate is limited by the buffer's size and latency. Displaying image frames at a high resolution and/or a high frame rate requires a huge size and low latency buffer which is expensive. Moreover, with limited processing power of the buffer an adaption of the pixels on-the-fly, e.g., of their colour or intensity values to account for changed ambient lighting or of their individual durations to account for geometric distortions of the displayed image, is impossible to implement.

BRIEF SUMMARY

It is an object of the present disclosed subject matter to provide a display apparatus which allows for displaying an image frame with a high resolution and/or at a high frame rate.

This object is achieved with a display apparatus, comprising

- a light source configured to emit a light beam;
- a light source driver configured to drive the light source according to pixels of an image frame to be displayed on an image area within a frame duration;
- a mirror assembly with one or more mirrors configured to oscillate and deflect the light beam towards the image area according to a scan pattern;
- a mirror driver configured to drive the mirror assembly according to said scan pattern;
- a buffer connected to the light source driver and the mirror driver and configured to buffer pixels of the image frame and to feed, synchronised by the mirror driver one or more times per frame duration starting from an initial position within the scan pattern, the buffered pixels successively to the light source driver for displaying; and
- a central processing unit (CPU) connected to the buffer and configured to hold the image frame in a memory, to determine a sequence of pixels of the image frame to be successively displayed according to said scan pattern starting from said initial position, and to transfer said sequence of pixels in one or more successive segments to the buffer for buffering.

The present display apparatus is based on a separation of time-critical real-time components, like the mirror driver, the light source driver and the buffer that need to be exactly synchronised to one another, from a central processing unit (CPU) that may only be loosely synchronised to the real-time components. The CPU thus gains valuable headroom or "slack" for the task of determining the playout-order of the pixels and transferring the pixels in that order to the buffer. The CPU can, hence, be a commercially available general purpose CPU that does not need to be real-time capable. Provided that the sequence of pixels is determined sufficiently fast so that the buffer is sufficiently filled for each next feeding, the CPU is free to perform additional tasks, e.g., computations of dynamic brightness or distortion corrections by altering the pixels of the image frame held in the memory on-the-fly.

The buffer receives the pixels from the CPU already in the correct order, i.e. as they are to be played-out according to the scan pattern. The buffer can, thus, retrieve the buffered pixels with a fast sequential contiguous ("linear") buffer access and quickly feed them to the light source driver. Furthermore, as the buffer buffers the pixels in the correct order it need not be synchronised each time a new pixel is to be played-out but, e.g., only when the play-out of several pixels (a "batch" of pixels) shall be (re-)synchronised to the mirror movement. Hence, a synchronisation or trigger signal may be sent less often to the buffer. As a result, the buffer is eased from processing frequent synchronisation signals and from identifying scattered memory addresses when retrieving the pixels from the buffer. The buffer can feed the pixels to the light source driver at a higher rate, and the present display apparatus is capable to display image frames with a higher resolution and/or with a higher frame rate.

The scan pattern may be a non-raster scan pattern, e.g., a spiral pattern, or even a raster scan pattern. In a beneficial embodiment the scan pattern is a Lissajous pattern, which allows to exploit resonances of the mirrors of the mirror assembly and, hence, to achieve higher speeds of the light beam and higher frame rates.

The mirror driver may synchronise the feeding of the pixels from the buffer, one by one or in batches, only once in a frame period. In an optional embodiment the mirror driver is configured to synchronise said feeding at least twice per frame duration. This ensures a tight synchronisation of the buffer read-out and light source driving to the mirror movement.

In an advantageous variant of this embodiment the mirror driver is configured to synchronise the buffer each time a periodic driving signal for driving one of said one or more mirrors about an axis reaches a predetermined level. In this way, the mirror driver employs the periodic driving signal to synchronise the buffer periodically, e.g., at every zero-crossing, maximum, minimum and/or turning point of a sine or cosine driving signal. Such a periodic and, hence, regular and more predictable synchronisation allows to use simpler circuitry for the buffer controller and for a faster processing in the buffer.

In a favourable embodiment the CPU is configured to transfer the sequence of pixels in at least two successive segments. By using several smaller segments instead of one large segment the buffer may be smaller and faster. For example, the buffer may be cost-efficiently embodied as a field programmable gate array (FPGA), an application specific integrated circuit ASIC and/or be even integrated into the mirror driver or the laser driver.

The loose synchronisation of the CPU to the real-time components may be established in many ways. For instance, the CPU may be synchronised by the mirror driver, by means of a common system clock, by transferring a new segment every n-th clock cycle of the CPU, etc. The disclosed subject matter provides for two optional embodiments of a synchronisation of the CPU to the real-time components.

In the first optional embodiment the CPU is configured to transfer a new one of said segments to the buffer when a filling level of the buffer falls below a predetermined threshold. Thereby, the CPU is—via the buffer—indirectly synchronised by the mirror driver and, thus, in approximate synchronism with the mirror movement. Moreover, as the transfer of a new segment depends on the filling level of the buffer, both buffer overflow and buffer underflow are efficiently avoided.

In the second optional embodiment the CPU is configured to transfer a new one of said segments to the buffer when a predetermined time interval has lapsed. Thereby, the segments are transferred at a constant frequency, allowing to utilise simple and fast timing circuitry in the buffer controller and to display the image frame with a particularly high resolution and/or frame rate.

In a favourable variant of the second optional embodiment each segment comprises the number of pixels fed between two synchronisations, the time interval is equal to or smaller than a shortest duration between two synchronisations, and the central processing unit is configured to suspend transferring a new one of said segments when the filling level of the buffer exceeds a predetermined threshold. Thereby, the segments are transferred at a constant frequency (i.e., the inverse of the time interval) corresponding to the fastest possible mirror movement (i.e., to the shortest duration between two synchronisations) such that a buffer underflow is strictly avoided. Suspending the transfer of a new one of said segments when the filling level of the buffer exceeds a predetermined threshold inhibits any buffer overflow.

In a further embodiment the CPU is configured to determine the sequence of pixels in successive parts. In this way, the CPU determines the pixels of the sequence of pixels at several instances of time, e.g., one part every n-th clock cycle of the CPU. Hence, between each two of those instances the CPU may adapt the pixels of the image frame to dynamically correct display brightness, for instance to account for a change in ambient lighting or to correct for geometrical distortions, e.g., due to a change in image area geometry. To this end, each part comprises optionally at least one segment such that pixels of a determined part may be promptly transferred to the buffer, e.g., within the same or the next CPU clock cycle of its determination.

The CPU may determine the sequence of pixels based on an on-the-fly calculation of the scan pattern. For a particularly fast determination the CPU is optionally configured to store a look-up table of indices of the pixels to be successively displayed according to said scan pattern and to determine the sequence of pixels by retrieving the pixels according to the look-up table from the memory. The CPU can easily and quickly determine the sequence of pixels by accessing the look-up-table to obtain the indices of the pixels and then the memory to retrieve the pixels according to the indices.

In an advantageous variant of this embodiment the CPU has a graphics processing unit (GPU) configured to process the indices as coordinates of a first texture and to retrieve the pixels by sampling the image frame according to the first texture. The processing of the indices as coordinates of a texture exploits the sophisticated texture mapping capability of modern GPUs.

Optionally, the GPU is configured to process the image frame as a second texture. A sampling of one texture, the image frame, according to another texture, the indices, by means of the, e.g., "texture" or "texture2D" functions in the GPU language standard OpenGL Shading Language (GLSL), results in a fast and efficient determination of the sequence.

In some embodiments the image frame may be displayed by a mono-coloured light beam. For displaying a multi-coloured image frame in optional embodiments, the light beam has at least two colours, e.g. the three colours red, green, blue, and each pixel comprises a colour value for each of said colours.

In some multi-colour embodiments the light beam may be comprised of coincident partial light beams each of a respective one of said colours, for instance by merging partial light beams emitted at different locations by different sub-light sources. In order to reduce beam merging optics, in an optional multi-colour embodiment the light beam is comprised of mutually spaced partial light beams each of a respective one of said colours.

In a first variant of this embodiment, the central processing unit is configured to determine the sequence of pixels, for each of successive positions within said scan pattern starting from said initial position, by retrieving those pixels of the image frame that are to be displayed by the partial light beams at this position and using the respective colour values of the retrieved pixels for the pixel of the sequence to be displayed at that position. In this way, each pixel of the sequence of pixels holds the correct colour values to be concurrently displayed by the different partial light beams.

In a second variant of this embodiment with parallel partial light beams, the central processing unit is configured to establish, for each of said colours, a respective offset of the indices of the pixels to be displayed by the partial light beam of that colour from the indices of the look-up table, to write, into each pixel of the image frame, the respective colour value of those pixels of the image frame whose indices are offset by the respective offset from the index of that pixel, and to retrieve the pixels according to the look-up table from the memory. Thereby, the colour values of the pixels of the image frame are "re-sorted", i.e., the image frame is pre-processed, to be read-out according to a single scan pattern following the look-up table, despite of the different light beams following actually slightly offset scan patterns. On the one hand, the pre-processing can be carried out very fast, e.g., pixel-by-pixel of the image frame with a sequential memory access, or by merging the red, green, and blue colour values of three copies of the image frame which are mutually shifted by the offset. On the other hand, the accurate retrieval along the scan pattern needs to be carried out only once. Consequently, a fast and efficient determination of the sequence of pixels is obtained for a multi-colour embodiment of the display apparatus.

For a tight integration of the display apparatus into, e.g., a temple of a frame of AR- or VR-glasses, the mirror driver, the laser source driver, the buffer, and the central processing unit may favourably be arranged on a single printed circuit board.

BRIEF DESCRIPTION OF THE DRAWINGS/FIGURES

Figure 2:
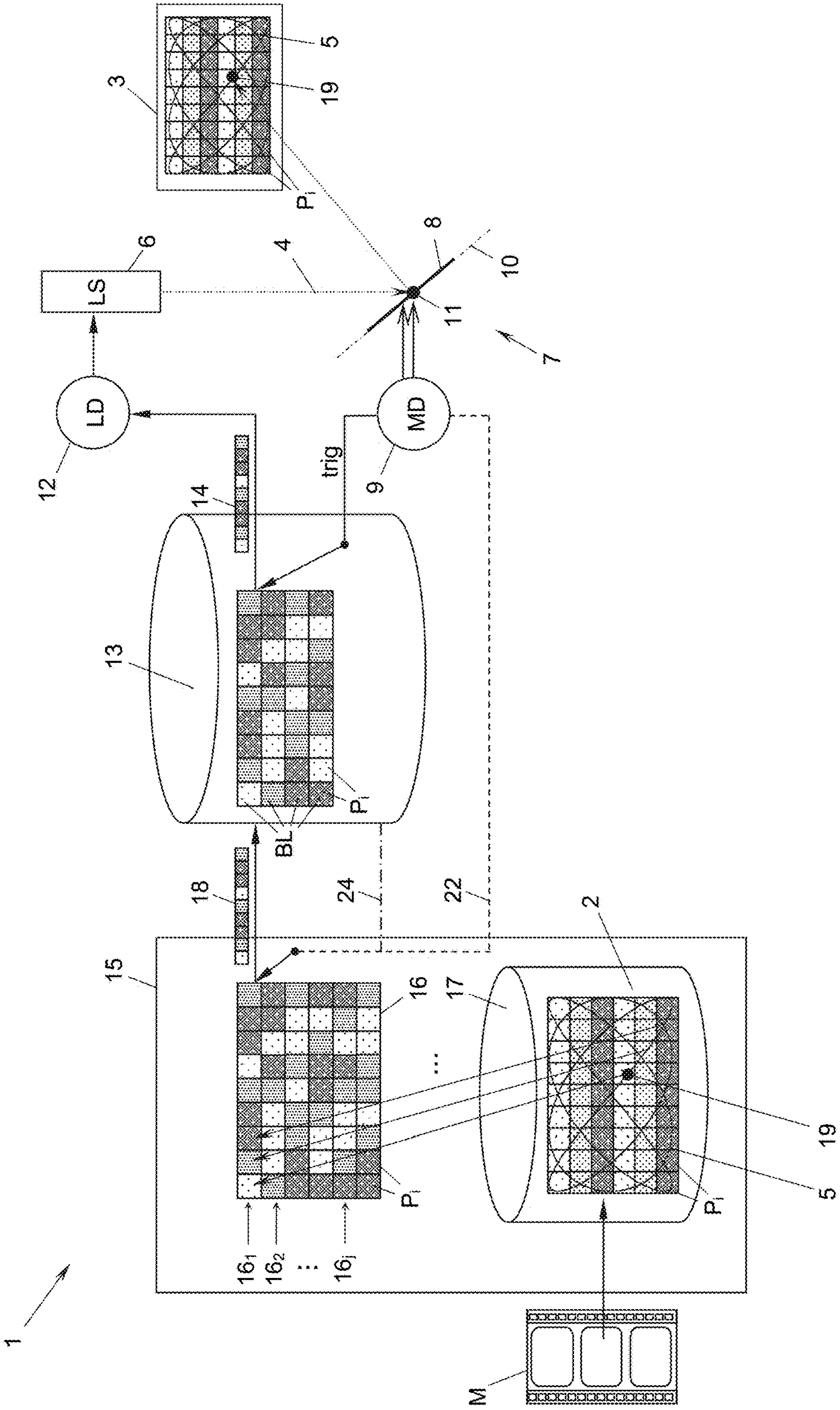
Figure 3:
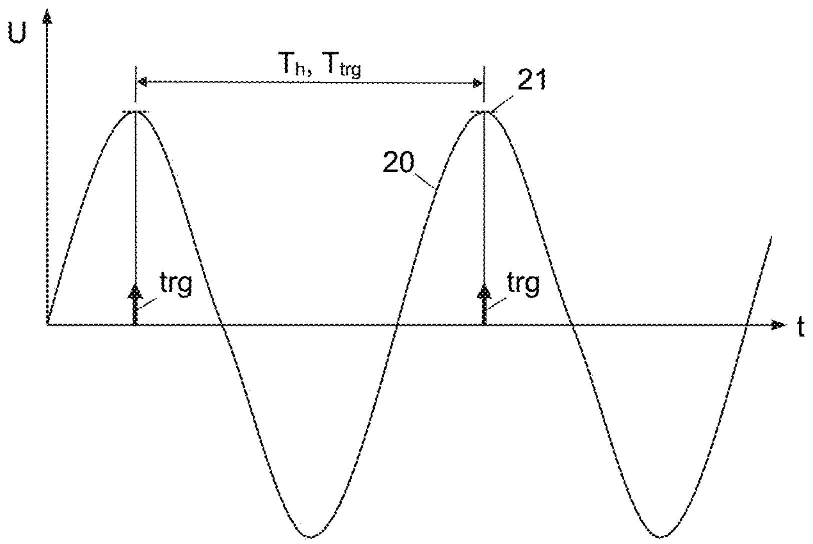
Figure 4:
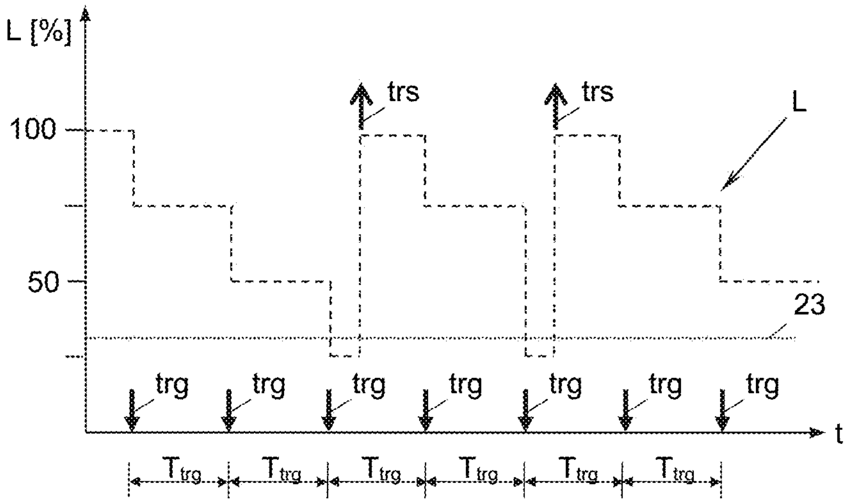
Figure 5:
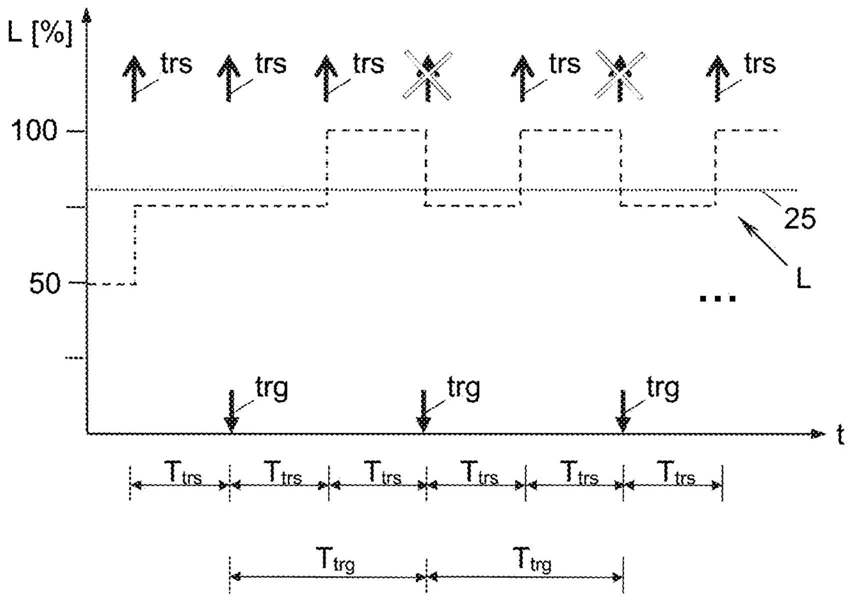
Figure 7:
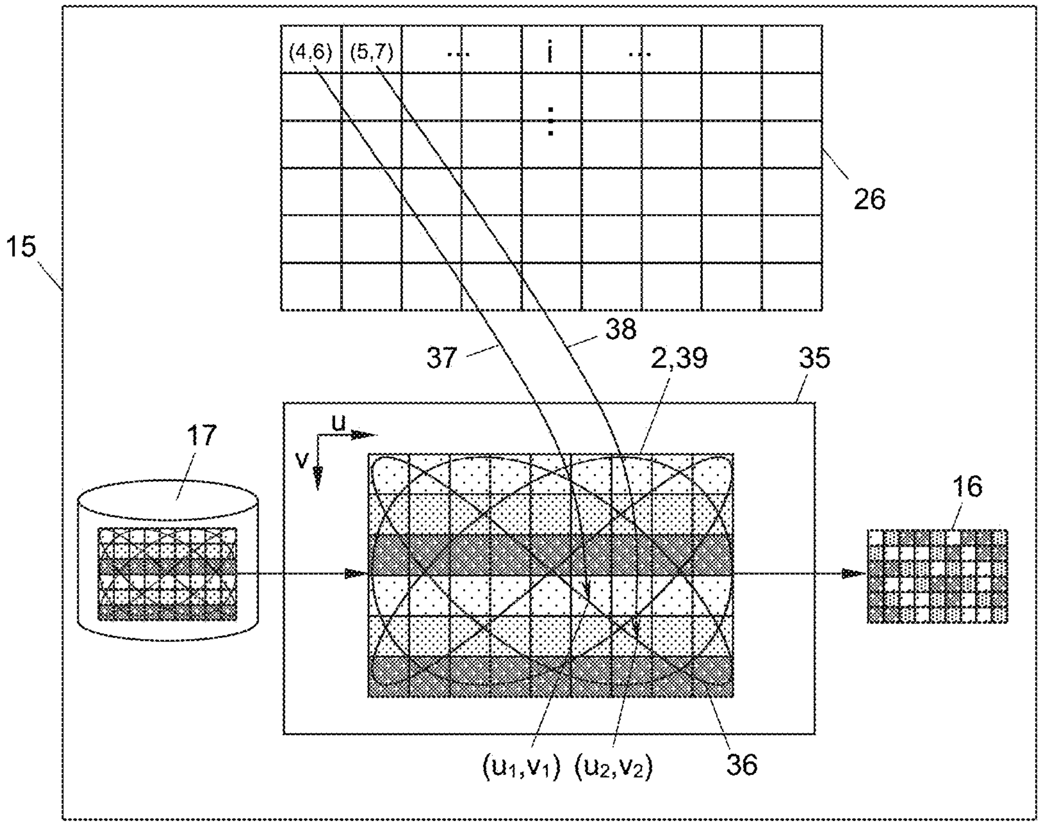
Figure 6:
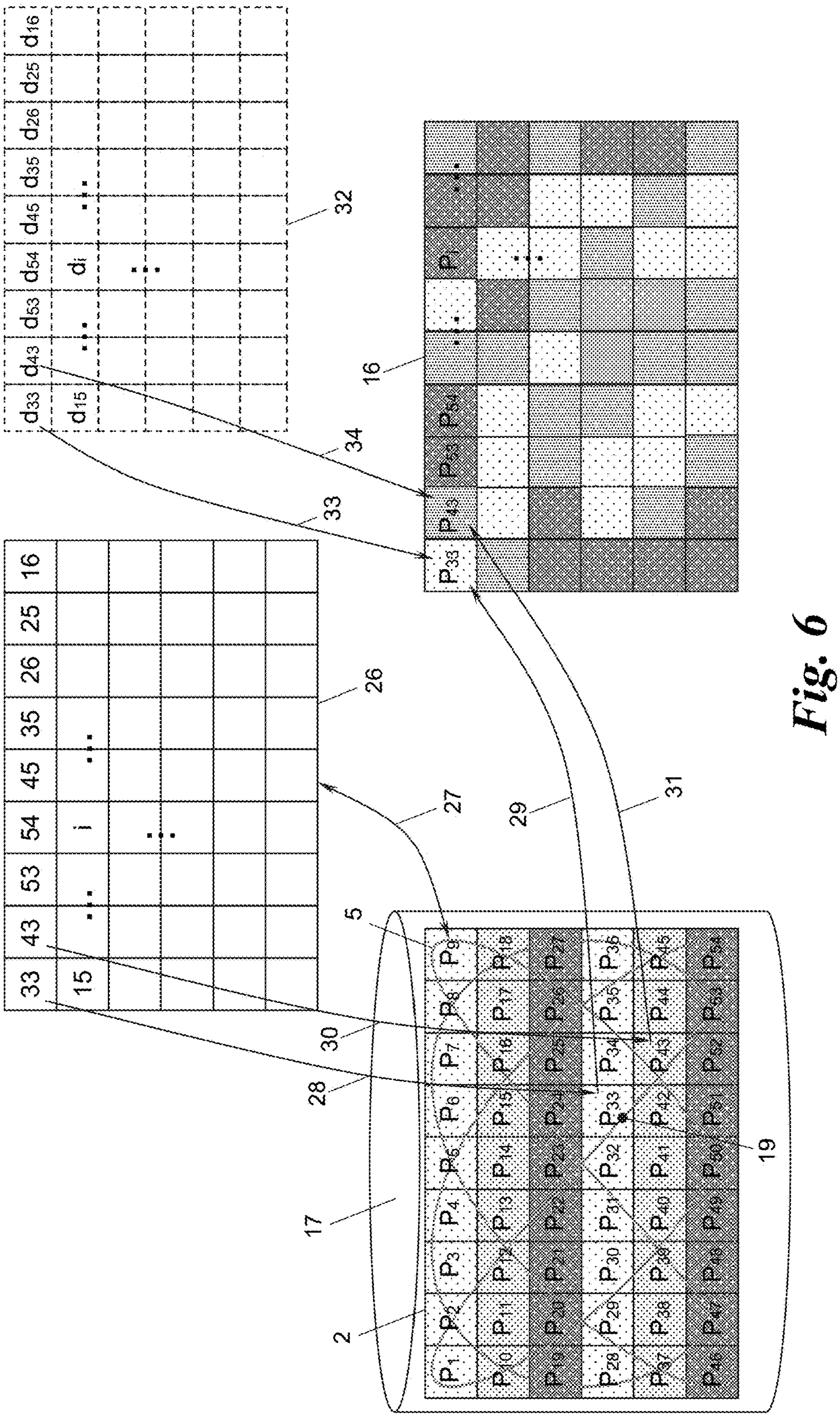
Figure 8:
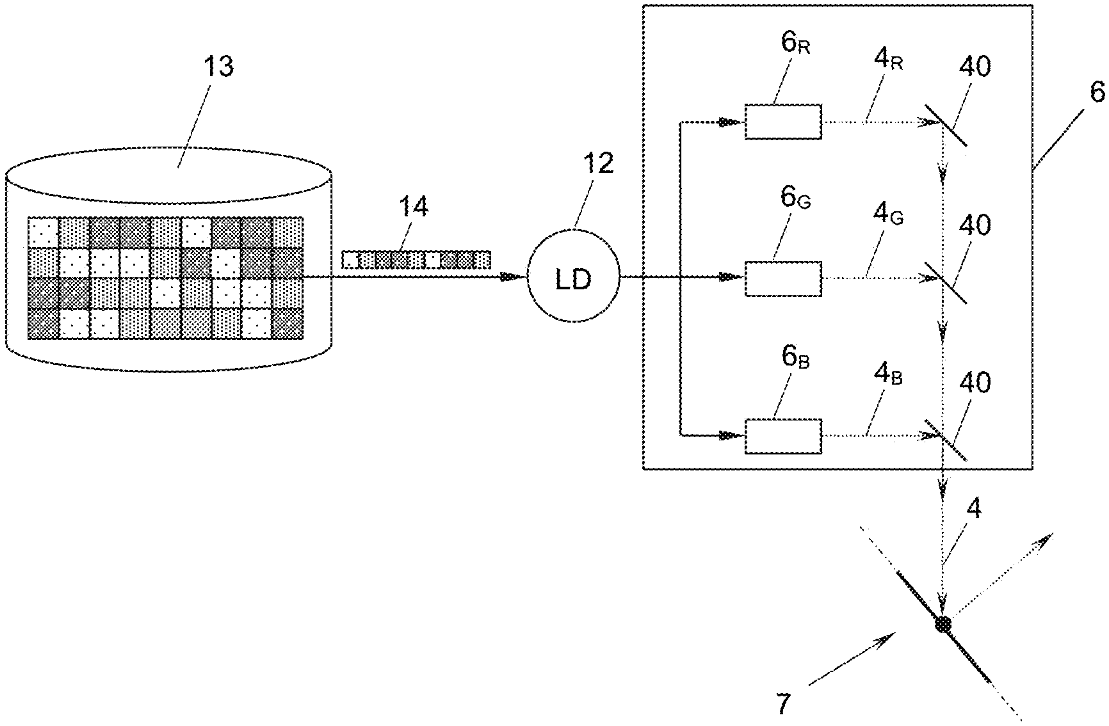
Figure 9:
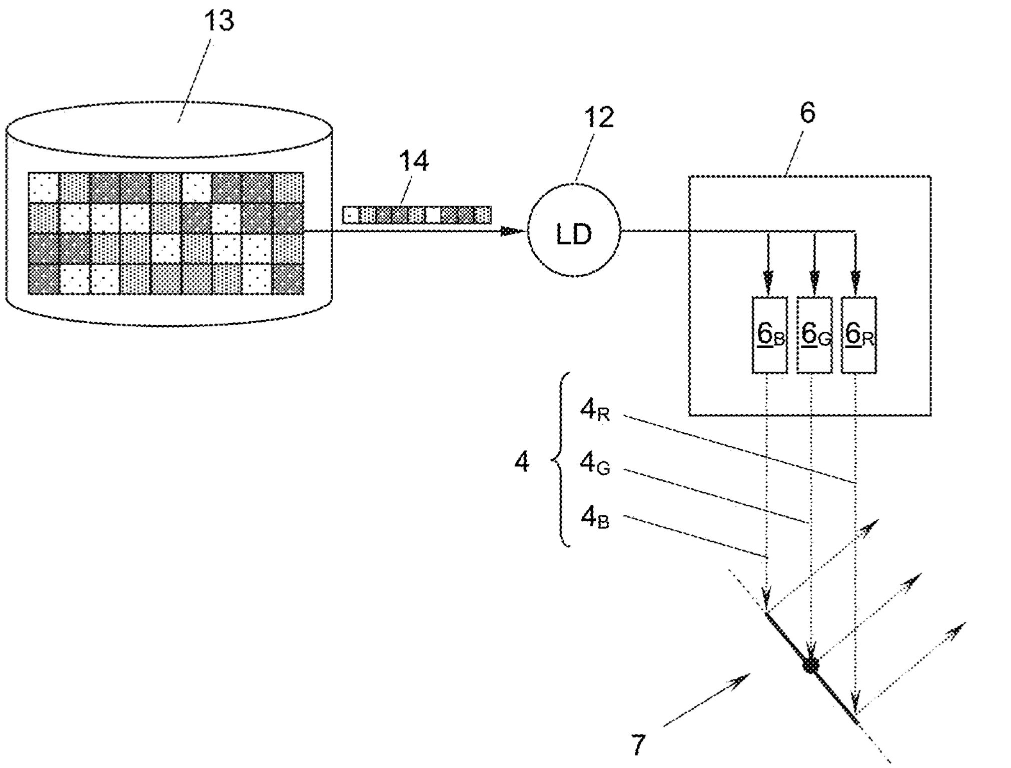
Figure 10:
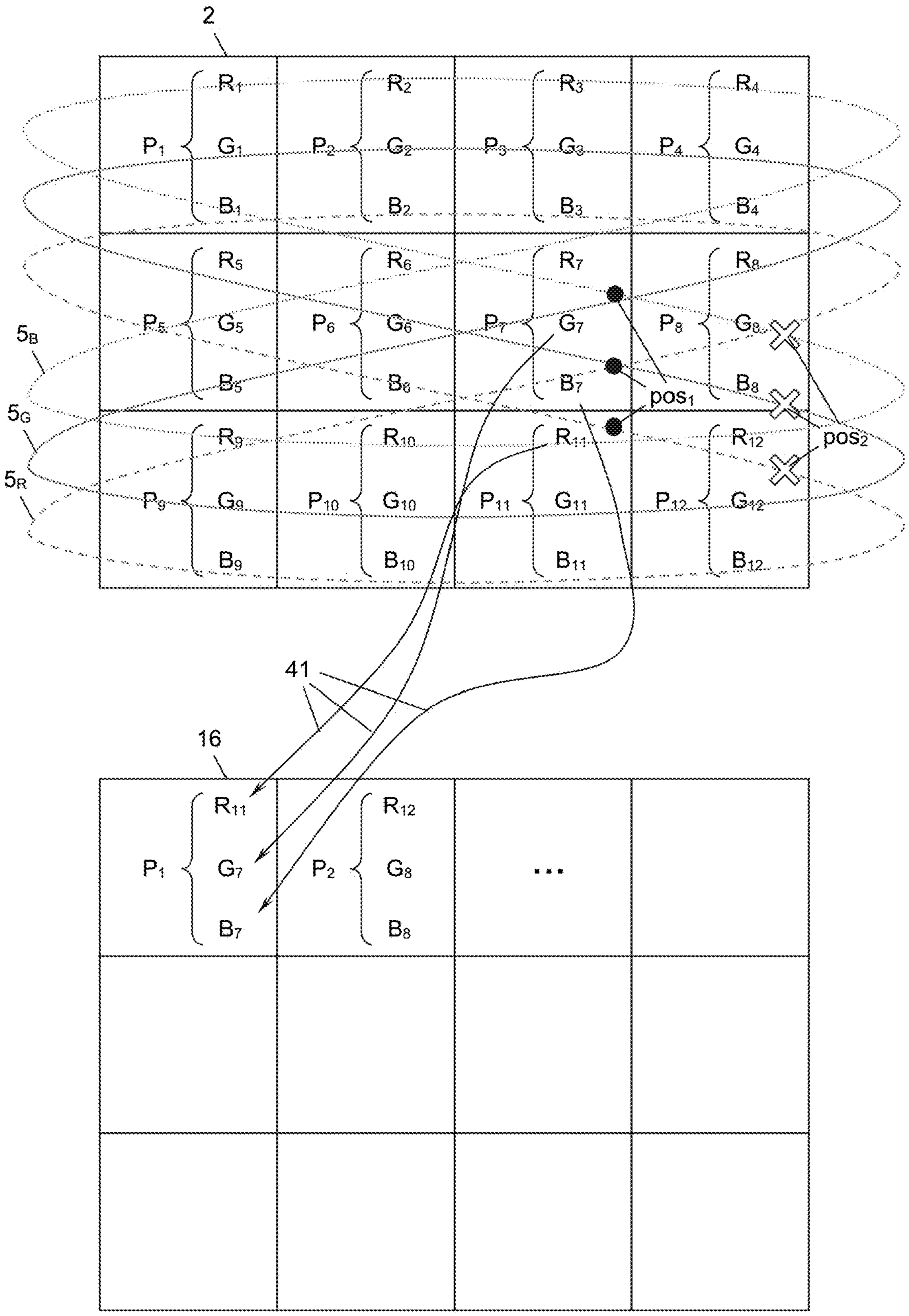
Figure 11:
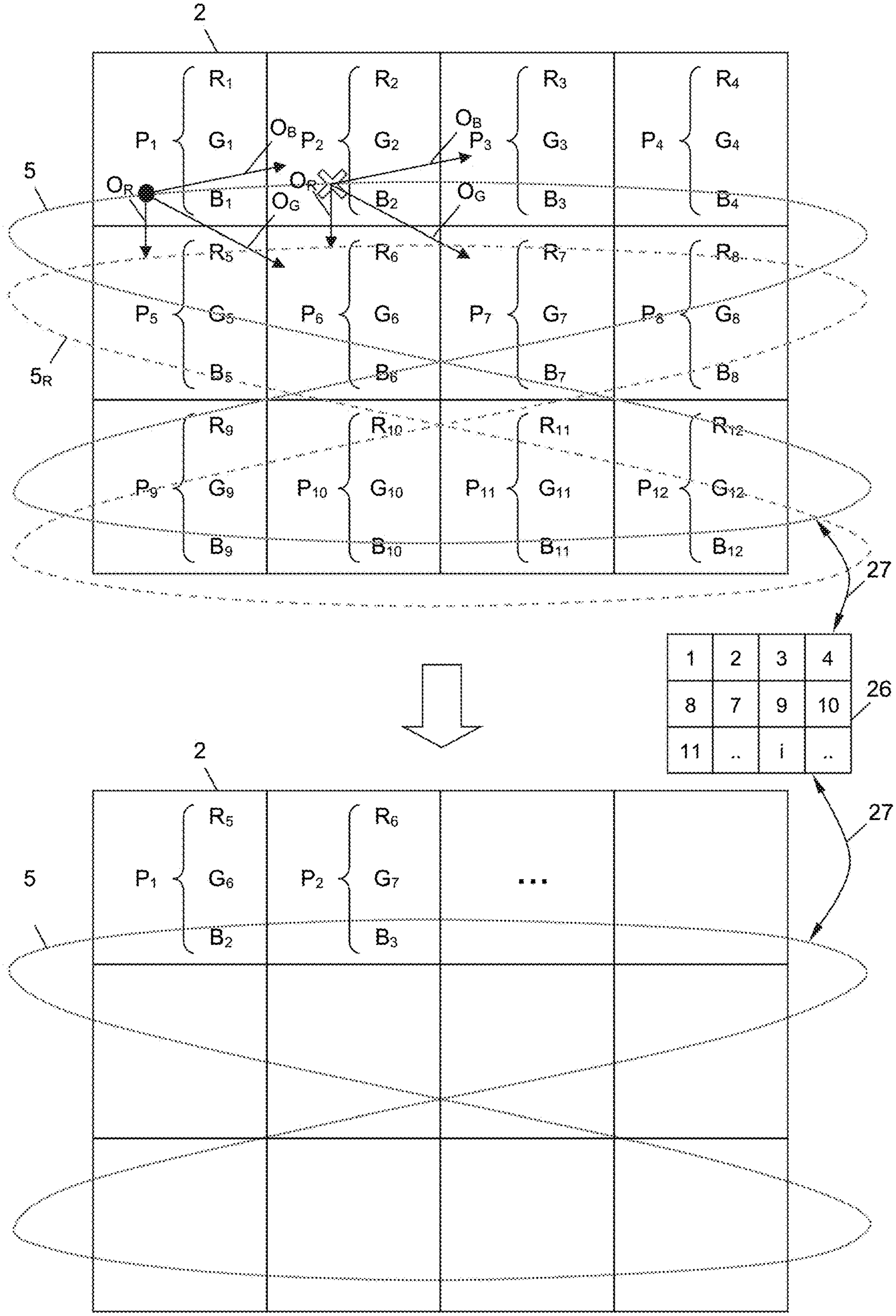

The disclosed subject matter will now be described by means of exemplary embodiments thereof with reference to the enclosed drawings, in which show:

FIG. 1 a display apparatus according to the disclosed subject matter in the process of displaying an image on an image area in a perspective view;

FIG. 2 a central processing unit, a buffer, a light source, a MEMS mirror, a light source driver and a mirror driver of the display apparatus of FIG. 1 in a schematic circuit diagram;

FIG. 3 a periodic driving signal of the MEMS mirror of FIG. 2 about a horizontal axis in a diagram of a driving voltage U over time t;

FIG. 4 a filling level of the buffer of FIG. 2 as obtained by employing an exemplary timing scheme for transferring pixels to and from a buffer in a diagram of the filling level L over time t;

FIG. 5 a filling level of the buffer of FIG. 2 as obtained by employing another exemplary timing scheme for transferring pixels to and from a buffer in a diagram of the filling level L over time t;

FIG. 6 an exemplary determination of a sequence of pixels as performed by the central processing unit of FIG. 2 in a schematic diagram;

FIG. 7 a variant of the determination of FIG. 6 in a schematic diagram;

FIG. 8 the buffer, the light source driver, the light source, and the MEMS mirror of FIG. 2 in the process of displaying a multi-coloured light beam comprised of merged partial light beams in a schematic circuit diagram;

FIG. 9 the buffer, the light source driver, the light source, and the MEMS mirror of FIG. 2 in the process of displaying a multi-coloured light beam comprised of mutually displaced partial light beams in a schematic circuit diagram;

FIG. 10 an exemplary determination of the sequence of pixels as performed by the central processing unit of FIG. 2 for displaying the multi-coloured light beam of FIG. 9 in a schematic diagram; and FIG. 11 a pre-processing of an image frame as performed by the central processing unit of FIG. 2 for displaying the multi-coloured light beam of FIG. 9 in a schematic diagram.

DETAILED DESCRIPTION

FIG. 1 shows a display apparatus 1 displaying an image frame 2 onto a wall 3 by scanning the wall 3 with a pulsed or continuous light beam 4 according to a scan pattern, here: a Lissajous pattern 5, to draw, one after the other, pixels $P_i$ of the image frame 2. The image frame 2 may have a pixel resolution according to a conventional image or video standard, e.g., full HD (1920×1080 pixels), UHD (3840×2160 pixels), 4K (4096×2160 pixels) etc., and the scan pattern may densely cover the pixels $P_i$; however, for illustrational purposes an image frame 2 with only few pixels $P_i$ and a simple, coarse Lissajous pattern 5 have been shown in FIG. 1. Instead of the Lissajous pattern 5 shown, the scan pattern may be any other non-raster scan pattern, e.g., a spiral pattern, or even a raster scan pattern.

The image frame 2 is displayed for at least one frame duration Tfr and may be part of a movie M or be a single image, e.g., a photo to be displayed for a longer period of time. Instead of a wall 3, the display apparatus 1 could display the light beam 4 onto any kind of image area, such as a board, projection screen, poster, the retina of an eye, an augmented reality (AR) combiner waveguide, another combiner optics, or the like. Accordingly, the display apparatus 1 may be part of a projector, AR or VR (virtual reality) glasses, a helmet, a head-up display, etc.

With reference to FIGS. 1 and 2, the display apparatus 1 has a light source 6 emitting the light beam 4 and a mirror assembly 7 with one or more (here: one) micro-electro-mechanical-system, MEMS, mirrors 8 for deflecting the emitted light beam 4 towards the wall 3. The MEMS mirror 8 is driven by a mirror driver 9, e.g., with the driving signal of FIG. 3, to oscillate about a horizontal axis 10 with a horizontal oscillation period $T_h$ and about a vertical axis 11 with a vertical oscillation period $T_v$, in order to deflect the emitted light beam 4 towards the wall 3 according to said Lissajous pattern 5. As the oscillation of the MEMS mirror 8 determines the deflection pattern, i.e. the Lissajous pattern 5, both the oscillation and the deflection are carried out according to one and the same Lissajous pattern 5.

The mirror assembly 7 may either comprise one MEMS mirror 8 oscillating about the horizontal and vertical axes 10, 11 or two MEMS mirrors 8, one after the other in the optical path of the light beam 4, each of which MEMS mirrors 8 then oscillating about one of the horizontal and vertical axes 10, 11.

Depending on the Lissajous pattern 5 to be displayed, $T_h$ and $T_v$ may be chosen such that the trajectory of the light beam 4 on the image plane 2 densely covers the entire image plane 2 during the period $T_{fr}$ of one image frame 2. Such a "complex" or "dense" Lissajous pattern 5 can be achieved when the frequencies $f_h=1/T_h$, $f_v=1/T_v$ are greater than the frame rate $f_{fr}=1/T_{fr}$, e.g., greater than 1 kHz or tens of kHz, and the beginnings of their respective oscillation periods meet, e.g., only over every one or more image frames 2, in particular when the frequencies $f_h$, $f_v$ are close to each other. To this end, frequencies $f_h$, $f_v$ with a small greatest common divisor, e.g. smaller than 10, may be employed, for example.

The light source 6 may be any light source known in the art, e.g., an incandescent lamp, a gas, liquid or solid laser, a laser diode, an LED, etc. The light source 6 is driven by a light source driver 12 according to the pixels $P_i$ of the image frame 2. In case the light source 6 displays a mono-colour, black and white, or grey scale image frame 2 with a mono-coloured light beam 4, each pixel $P_i$ comprises a single colour value, e.g., a brightness or intensity value, and in case the light source 6 displays a multi-colour image frame 2 with a multi-coloured light beam 4, each pixel comprises several colour values, e.g., RGB values indicating the brightness or intensity of a red, green, and blue colour, YPbPr values, etc. In addition to the colour value/s, each pixel $P_i$ may comprise a duration $d_i$ (FIG. 6) indicating the light source driver 12 how long the light beam 4 is to display that pixel $P_i$, in order to optionally account for the varying velocity of the light beam 4 in Lissajous-scanning and correct for geometric distortions. Alternatively, each pixel $P_i$ may be displayed for the same pre-set duration and not comprise any duration $d_i$.

To synchronise the light source driver 12 and the mirror driver 9 the display apparatus 1 has a buffer 13 which is connected to the light source driver 9 and the mirror driver 12. The buffer 13 buffers pixels $P_i$ of the image frame 2 in the correct order, i.e. in that order in which they are to be displayed. The buffer 13, e.g. by means of an internal buffer controller, feeds—synchronised by the mirror driver 9—the buffered pixels $P_i$ successively to the light source driver 12. In one embodiment the buffer 13 feeds the buffered pixels $P_i$ in batches 14 of one or more successive pixels $P_i$, one batch 14 each time a synchronisation or trigger signal trig is received. In another embodiment the buffer 13 feeds the pixels $P_i$ successively according to an internal clock of the buffer 13, which internal clock is re-synchronised with the frequencies $f_h$, $f_v$ of the mirror driver 9 each time it receives the trigger signal trig.

In any case, the light source driver 12 drives the light source 6 according to the pixels $P_i$ fed thereto. The buffer 13, the light source driver 12 and the mirror driver 9 are, thus, tightly synchronised and form the time-critical real-time part of the display apparatus 1.

To supply the buffer 13 with the pixels $P_i$ in said correct order the display apparatus 1 has a central processing unit (CPU) 15. The CPU 15 transforms the image frame 2, whose pixels $P_i$ are not ordered according to the Lissajous pattern 5, to a pixel sequence 16 whose pixels $P_i$ are ordered according to the Lissajous pattern 5. The CPU 15 transfers the pixel sequence 16 to the buffer 13 for buffering. The CPU 15 holds the image frame 2 in a memory 17, e.g. an SRAM or DRAM memory, which may be part of the CPU 15 or external therefrom. The CPU 15 determines the sequence 16 of pixels $P_i$ of the image frame 2 to be successively displayed according to the Lissajous pattern 5, e.g., as described below with reference to FIGS. 6, 10 and 11, and transfers the determined sequence 16 in segments 18 to the buffer 13.

To achieve a "loose" synchronisation between the CPU 15 and the real-time components per one (or more) image frame/s 2, the CPU 15 determines the sequence 16 starting from an initial position 19 within the Lissajous pattern 5. The initial position 19 can be chosen arbitrarily within the Lissajous pattern, however, it needs to be a common reference for both the CPU 15 when determining the pixel sequence 16 and the buffer 13 when feeding the pixels $P_i$ to the light source driver 12. For example, the initial ("reference") position 19 can correspond the top left pixel $P_i$ drawn on the wall 3, or any other selected pixel $P_i$ within an image frame 2. The repeated synchronisation of the buffer 13 can thus be considered to "start" anew whenever the light beam 4 re-visits the initial position 19. Hence, initially the CPU 15 determines and transfers a first segment 18 of the sequence 16 to the buffer 13 so that it is available there for feeding to the light source driver 12 to start the displaying of the pixels along the Lissajous pattern 5 from the initial position 19 onwards.

The mirror driver 9 may employ a variety of timing schemes to synchronise the feeding of the pixels $P_i$ from or the buffer 13, e.g., regularly at a given frequency or irregularly, only once per frame duration Tfr (to feed the whole image frame 2 in one large batch 14, not shown) or several times per frame duration Tfr to feed the image frame 2 in several smaller batches 14 (FIG. 2) or in single pixels $P_i$.

It shall be noted that the pixels $P_i$ that are displayed between each two synchronisations may be regarded as a "line" BL of pixels $P_i$ and the buffer 13 as a line buffer buffering one or more lines BL of pixels $P_i$. Two lines BL need not necessarily comprise the same number of pixels $P_i$ due to the Lissajous oscillation. The CPU 15 may pad or discard pixels $P_i$ in the sequence 16 or the segments 18 to generate lines BL for the buffer 13 that each have the same number of pixels $P_i$ to simplify the implementation of the buffer 13 as a line buffer.

FIG. 3 describes an exemplary synchronisation timing on the basis of a periodic driving signal 20 (here: a sine signal) applied by the mirror driver 9 to drive the MEMS mirror 8 about the horizontal axis 10. For example, the mirror driver 9 triggers the buffer 13 with the signal trig each time the driving signal 20 reaches a predetermined level 21, a zero crossing or minimum/maximum, (see arrows trg) with a duration $T_{trg}$ between two triggerings trg. Of course, any other regular or irregular triggering duration $T_{trg}$ is possible to synchronise the buffer 13 more often or more rarely per oscillation period $T_h$.

The CPU 15 guarantees that the buffer 13 is always sufficiently filled. To this end, the CPU 15 may employ a variety of timing schemes to transfer the sequence 16, be it once per frame duration $T_{fr}$ in one large segment 18 or several times per frame duration Tfr in several smaller segments 18, to the buffer 13.

In a first embodiment shown with a dashed line 22 in FIG. 2, the CPU 15 is triggered by the mirror driver 9 to transfer segments 18 in synchronicity with the mirror movement, e.g., at each initial position 19 or at regular intervals during each frame duration $T_{fr}$.

In a second embodiment shown in FIG. 4, the CPU 15 transfers a new segment 18 to the buffer 13 each time the filling level L of the buffer 13 falls below a predetermined threshold 23, see arrows trs. FIG. 4 depicts the situation for a threshold 23 of 30%, a buffer 10 with four lines BL and a feeding of one line BL per triggering (arrow trg), while the CPU 15 transfers segments 18 containing three lines each. The CPU 15 may detect falling below the threshold 23 by monitoring the filling level L itself or upon a communication from the controller of the buffer 13 monitoring the filling level L, as indicated in FIG. 2 by the chain-dotted line 24.

In a third exemplary embodiment, the CPU 15 transfers a new segment 18 each time a predetermined time interval $T_{trs}$ has lapsed, e.g., every n-th cycle of the clock of the CPU 15, and thus at a constant frequency $f_{trs}=1/T_{trs}$.

In a variant of the third embodiment shown in FIGS. 2 and 5, each batch 14 and each segment 18 comprises the same number of pixels $P_i$, (nine pixels $P_i$ per segment and per batch in FIG. 2), and the time interval $T_{trs}$ is predetermined to be equal to or smaller than the shortest duration $T_{trg}$ between two triggerings (FIG. 5), e.g., the shortest $T_{trg}$ in the embodiment of FIG. 3. The shortest duration $T_{trg}$ corresponds to the fastest movement of the MEMS mirror 8 such that the transfer frequency $f_{trs}$ is at least as high as the current trigger frequency $f_{trg}$.

When the MEMS mirror 8 oscillates as fast as possible, the time interval $T_{trs}$ is equal to the duration $T_{trg}$ and the buffer 13 is substantially filled at a constant level L. When the MEMS mirror 8 oscillates slower than possible, the time interval $T_{trs}$ is shorter than the duration $T_{trg}$ and the filling level L of the buffer 13 rises. To avoid a buffer overflow in such a situation, the CPU 15 detects that the filling level L exceeds a predetermined threshold 25 of, e.g., 80% and suspends transferring a new segment 18, see crossed-out arrows trs in FIG. 5. Again, the CPU 15 may detect exceeding the threshold 25 by monitoring the filling level L itself or upon a communication from the buffer 13.

The CPU 15 may determine the sequence 16 of pixels $P_i$ in any time granularity, e.g., for each image frame 7 at once or successively in subsequent parts $\mathbf{16}_1$, $\mathbf{16}_2$, . . . , generally $\mathbf{16}_j$. Each part $\mathbf{16}_j$ may comprise one or more segments 18. Moreover, the CPU 15 may determine the sequence 16 in many ways, e.g., on-the-fly by matching positions that follow each other in time along the Lissajous pattern 5 to pixels $P_i$ in the image frame 2 occurring at these positions.

Alternatively, with reference to FIG. 6, the sequence 16 of pixels $P_i$ can be determined by the CPU 15 by means of a pre-calculated look-up table 26. The look-up table 26 holds indices i of the pixels $P_i$ to be successively displayed according to the Lissajous pattern 5. The index i of a pixel $P_i$ indicates the position of that pixel $P_i$ within the image frame 2, and via that position its memory address in the memory 17. Each index i may, for instance, be an integer, e.g., i=33 indicating that pixel $P_{33}$ is the $33^{rd}$ in the image frame 2, or a composite index such as, e.g., i=(4,6) indicating that pixel $P_{4,6}$ is in the $4^{th}$ row and $6^{th}$ column of the image frame 2, or a (hexadecimal) memory address i=(0x123456) indicating that pixel $P_{0x123456}$ is held at the memory address 0x123456, etc.

As illustrated in FIG. 6 by the arrow of correspondence 27, the look-up table 26 reproduces the Lissajous pattern 5 running over the image frame 2 starting from the initial position 19 and holds, for each of the pixels $P_i$ as they are subsequently passed by the Lissajous pattern 5, the corresponding pixel index i. Hence, the CPU 15 can determine the sequence 16 of pixels $P_i$ by retrieving, pixel-for-pixel, the pixels $P_i$ from the memory addresses indicated by the indices i of the look-up table 26.

In the example of FIG. 6 the CPU 15 looks-up the first index i=33 in the look-up table 26, which is the index i of pixel $P_{33}$ to be played out at the initial position 19 within the Lissajous pattern 5, then retrieves pixel $P_{33}$ from the memory address corresponding to the pixel index i=33 (see arrow 28) and puts it as first pixel into the sequence 16 (arrow 29). Then the CPU 15 looks-up the second pixel index i=43 in the look-up table 26, which is the index i of pixel $P_{43}$ to be played out next within the Lissajous pattern 5, retrieves pixel $P_{43}$ from the memory address corresponding to the pixel index i=43 (arrow 30) and appends it as second pixel $P_{43}$ to the sequence 16 (arrow 31), and so on and so forth to determine the sequence 16. In this way, the CPU 15 samples by means of the look-up table 26 the image frame 2 according to the Lissajous pattern 5 to determine the sequence 16.

As mentioned above, each pixel $P_i$ may optionally contain a duration $d_i$ indicating how long that pixel $P_i$ is to be displayed by the light source 6. The duration $d_i$ may be provided in a duration table 32 and included into the corresponding pixel $P_i$ of the sequence 16 when determining the sequence 16. For instance, the duration $d_{33}$ of the pixel $P_{33}$ to be played out first may be included in the pixel $P_{33}$ (see arrow 33), the duration $d_{43}$ of the pixel $P_{43}$ to be played out next may be included in the pixel $P_{43}$ (see arrow 34), etc. Instead of using a pre-calculated duration table 32 the durations $d_i$ may be calculated by the CPU 15 in dependence of the Lissajous pattern 5 on-the-fly.

FIG. 7 shows a further variant of the look-up table embodiment wherein the CPU 15 comprises a graphics processing unit (GPU) 35. The GPU 35 receives the image frame 2 from the memory 17 and the indices i from the look-up table 26 and processes the indices i as coordinates $u_i$, $v_i$ of a texture 36. For example, the first index i=(4, 6) of the look-up table 26 corresponding to pixel $P_{4,6}$ in the $4^{th}$ row and the $6^{th}$ column of the image frame 2 is used as coordinates (4, 6)=($u_i$, $v_i$), see arrow 37; the second index of i=(5, 7) of the look-up table 26 corresponding to pixel $P_{5,7}$ in the $5^{th}$ row and the $7^{th}$ column of the image frame 2 is used as coordinates (5, 7)=($u_2$, $v_2$), see arrow 38, and so on.

The coordinates $u_i$, $v_i$ of the texture 36 follow the Lissajous pattern 5 over the image frame 2 such that the GPU 35 can retrieve the pixels $P_i$ by sampling the image frame 2 according to the texture 36 in a hardware texture mapping unit of the GPU 35. The GPU 35 may optionally further process the image frame 2 as another texture 39 which provides for an additional speed-up. For instance, the indices i of the look-up table 26 and the image frame 2 may each be processed with the "texture" or "texture2D" instruction according to the GPU standard OpenGL Shading Language (GLSL).

With reference to FIGS. 8 to 11, some multi-colour embodiments of the display apparatus 1 shall be described.

In a first multi-colour embodiment shown in FIG. 8, the light beam 4 is comprised of partial light beams $\mathbf{4}_R$, $\mathbf{4}_G$, $\mathbf{4}_B$ which are merged to form the light beam 4, e.g., via wavelength-selective mirrors 40 as known in the art. The light source driver 12 receives batches 14 of coloured pixels $P_i$ and drives respective sub light sources $\mathbf{6}_R$, $\mathbf{6}_G$, $\mathbf{6}_B$ of the light source 6 to emit the partial light beams $\mathbf{4}_R$, $\mathbf{4}_G$, $\mathbf{4}_B$. Thereby, the sequence 16 of pixels $P_i$ may be determined as described above, with each pixel $P_i$ having an RGB-value $R_i$, $B_i$, $G_i$ and optionally a duration $d_i$.

In a second multi-colour embodiment shown in FIG. 9, the light beam 4 is comprised of parallel partial light beams $4_R$, $4_G$, $4_B$ which are mutually spaced to one another. With mutual spacing, merging optics like the wavelength-selective mirrors 40 may be omitted, however, at the cost of projecting the image frame 2 slightly offset three times, once for each colour. The mutual displacement of the partial light beams $4_R$, $4_G$, $4_B$ thus has to be considered when determining the sequence 16 such that the correct colour values R, G, B are played out for each pixel $P_i$, e.g., according to one of the following two variants.

In the first variant shown in FIG. 10, the determination is carried out by sampling the image frame 2 one time for each colour, i.e., once for each of mutually offset copies of the Lissajous pattern $5_R$ (dashed line), $5_G$ (solid line), and $5_B$ (dotted line) displayed by the light sources $6_R$, $6_G$, $6_B$, respectively. The CPU 15 retrieves for successive positions $pos_1$ (black circles), $pos_2$ (white crosses), $pos_3$, . . . , generally $pos_1$, within the Lissajous pattern 5 the pixels $P_i$ of the image frame 2 that are to be displayed by the partial light beams $4_R$, $4_G$, $4_B$, and uses their colour values $R_i$, $G_i$, $B_i$ for the pixel $P_i$ of the sequence 16 to be displayed at that position $pos_1$. For instance, for the first position $pos_1$ within the Lissajous pattern 5 pixel $P_{11}$ is to be displayed by the red partial light beam $4_R$, pixel $P_7$ is to be displayed by the green partial light beam $4_G$, and pixel $P_7$ is to be displayed by the blue partial light beam $4_B$. Hence, the CPU 15 retrieves the red colour value $R_{11}$ of pixel $P_{11}$, the green colour value $G_7$ of pixel $P_7$, and the blue colour value $B_7$ of pixel $P_7$, and uses these colour values for the first pixel $P_i$ of the sequence 16 as indicated by arrows 41. For the second position $pos_2$, pixels $P_{12}$, $P_8$ and $P_8$ are to be displayed by the red, green and blue partial light beams $4_R$, $4_G$ and $4_B$, respectively, and the colour values $R_{12}$, $G_8$ and $B_8$ of pixels $P_{12}$, $P_8$ and $P_8$, respectively, are retrieved and used for the second pixel $P_2$ of the sequence 16, and so on and so forth. Of course, for retrieving the pixels $P_i$ and their colour values $R_i$, $G_i$, $B_i$ in the correct order, a look-up table 26 as described above may optionally be used for each colour channel. This variant may as well be employed for non-parallel mutually spaced partial light beams (not shown).

In the second variant shown in FIG. 11, the CPU 15 pre-processes the image frame 2 and samples the image frame 2 only once according to the Lissajous pattern 5 as follows.

Firstly, the CPU 15 establishes for each colour red, green and blue a respective offset $O_R$, $O_G$, $O_B$ of the indices i of the pixels $P_i$ to be displayed by the respective partial light beam $4_R$, $4_G$, $4_B$ from the indices i of the look-up table 26. For instance, for the colour red, the CPU 15 establishes a red offset $O_R$ which indicates how the indices i of the pixels $P_i$ that are displayed by the red partial light beam $4_R$ are offset from the indices i of the look-up table 26 at the corresponding positions $pos_1$ within the Lissajous pattern 5. In the example shown the CPU 15 establishes one single constant red offset $O_R$ (in FIG. 11: $O_R$=4) which indicates how the index i=5 of the first pixel $P_5$ displayed at the initial position $pos_1$ (black circle) by the red partial light beam $4_R$ is offset from the first index i=1 of the look-up table 26, how the index i=6 of the second pixel $P_6$ displayed at a second position $pos_1$ (indicated by a white cross) by the red partial light beam $4_R$ is offset from the second index i=2 of the look-up table 26, etc. Thereby, the indices i of the look-up table 26 describe a "reference" Lissajous pattern 5, and the offsets $O_R$, $O_G$, $O_B$ each describe a constant offset of the respective copy $5_R$, $5_G$, $5_B$ (only $5_R$ is shown in FIG. 11) of the reference Lissajous pattern 5 for the respective partial light beam $4_R$, $4^G$, $4_B$.

Depending on the format of the indices i of the pixels $P_i$, the offsets $O_R$, $O_G$, $O_B$ may, e.g., each be an integer when each index i is an integer or each be a vector when each index i is given as a composite index. Of course, any of the Lissajous pattern copies $5_R$, $5_G$ or $5_B$ may be used as the reference Lissajous pattern 5 when generating the look-up table 26 such that one of the offsets $O_R$, $O_G$ or $R_B$ will be zero.

The CPU 15 may establish the offsets $O_R$, $O_G$, $O_B$ in many ways to relate the physical mutual displacement of the light beams $4_R$, $4_G$, $4_B$ to the image frame 2, e.g., to best fit the image frame 2 with the Lissajous patterns $5_R$, $5_G$, $5_B$, to optimise an overlap of the Lissajous patterns $5_R$, $5_G$, $5_B$ on the image frame 2.

Secondly, the colour values $R_i$, $G_i$, $B_i$ of the pixels $P_i$ of the image frame 2 are now rewritten ("preprocessed"). To this end, the CPU 15 writes, into each pixel $P_i$ of the image frame 2, the colour values $R_i$, $G_i$, $B_i$ of those pixels $P_i$ whose indices are offset by the respective offset $O_R$, $O_G$, $O_B$ from the index i of that pixel $P_i$. In the example of FIG. 11 pixel $P_5$ is offset by the offset $O_R$=4, pixel $P_6$ by the offset $O_G$=1 and pixel $P_2$ by the offset $G_B$=5 from the pixel $P_i$. The CPU 15 rewrites pixel $P_i$ to have the red colour value $R_s$ of pixel $P_5$, the green colour value $G_6$ of pixel $P_6$ and the blue colour value $B_2$ of pixel $P_2$. For pixel $P_2$ the offset pixels are $P_6$, $P_7$ and $P_8$ such that pixel $P_2$ is rewritten to have the colour values $R_6$, $G_7$ and $B_8$, and so on and so forth. Of course, whenever an offset $O_R$, $O_G$, $O_B$ is out of the image frame 2 the respective colour value may be set either to zero, or to a nearest pixel's colour value, or be padded with a neighbouring pixel's colour value, etc. Moreover, when rewriting the colour values, the original, non-preprocessed image frame 2 is used to avoid using an already rewritten colour value for rewriting.

The rewriting or preprocessing of the image frame 2 may be carried out using a linear memory access, not following the Lissajous pattern 5 but the plain order of the pixels $P_i$ in the image frame 2, i.e. $P_1 \rightarrow P_2 \rightarrow P_3 \rightarrow P_3 \rightarrow P_4 \rightarrow P_5 \rightarrow P_6 \rightarrow$ . . . . The rewriting may as well be carried out by merging the corresponding colour values of offset red, green and blue copies of the image frame 2.

After the image frame 2 has been preprocessed in this way, the CPU 15 determines the sequence 16 of pixels $P_i$ therefrom as mentioned above to follow the Lissajous pattern 5, e.g., by retrieving the colour values of the pixels $P_i$ according to the indices i of the look-up table 26.

Besides determining and transferring the sequence 16 to the buffer 13 the CPU 15 may perform additional tasks. The CPU 15 may, e.g., generate the image frame 2, or may adapt the colour values $R_i$, $G_i$, $B_i$ and/or the durations $d_i$ of the pixels $P_i$, for instance according to ambient conditions such as ambient brightness, image area geometry etc. measured by sensors (not shown) connected to the CPU 15.

The disclosed subject matter is not restricted to the specific embodiments described above but encompasses all variants, modifications and combinations thereof that fall within the scope of the appended claims.

What is claimed is:

1. A display apparatus, comprising a light source configured to emit a light beam;

a light source driver configured to drive the light source according to pixels of an image frame to be displayed on an image area within a frame duration;

a mirror assembly with one or more mirrors configured to oscillate and deflect the light beam towards the image area according to a scan pattern;

a mirror driver configured to drive the mirror assembly according to said scan pattern;

a buffer connected to the light source driver and the mirror driver and configured to buffer pixels of the image frame and to feed, synchronised by the mirror driver sending a synchronisation signal to the buffer one or more times per frame duration starting from an initial position within the scan pattern, the buffered pixels successively to the light source driver for displaying; and a central processing unit connected to the buffer and configured to hold the image frame in a memory, to determine a sequence of pixels of the image frame to be successively displayed according to said scan pattern starting from said initial position, and to transfer said sequence of pixels in one or more successive segments to the buffer for buffering, wherein the mirror driver, the light source driver, and the buffer are real-time components which are tightly synchronised to one another and the central processing unit is loosely synchronised to the real-time components.

2. The display apparatus according to claim 1, wherein the scan pattern is a Lissajous pattern.

3. The display apparatus according to claim 1, wherein the mirror driver is configured to synchronise said feeding at least twice per frame duration.

4. The display apparatus according to claim 3, wherein the mirror driver is configured to synchronise the buffer each time a periodic driving signal for driving one of said one or more mirrors about an axis reaches a predetermined level.

5. The display apparatus according to claim 1, wherein the central processing unit is configured to transfer the sequence of pixels in at least two successive segments.

6. The display apparatus according to claim 5, wherein the central processing unit is configured to transfer a new one of said segments to the buffer when a filling level of the buffer falls below a predetermined threshold.

7. The display apparatus according to claim 5, wherein the central processing unit is configured to transfer a new one of said segments to the buffer when a predetermined time interval has lapsed.

8. The display apparatus according to claim 7, wherein each segment comprises a number of pixels fed between two synchronisations, the time interval is equal to or smaller than a shortest duration between two synchronisations, and the central processing unit is configured to suspend transferring a new one of said segments when a filling level of the buffer exceeds a predetermined threshold.

9. The display apparatus according to claim 5, wherein the central processing unit is configured to determine the sequence of pixels in successive parts, wherein each part comprises at least one segment.

10. The display apparatus according to claim 1, wherein the central processing unit is configured to determine the sequence of pixels in successive parts.

11. The display apparatus according to claim 1, wherein the central processing unit is configured to store a look-up table of indices of the pixels to be successively displayed according to said scan pattern and to determine the sequence of pixels by retrieving the pixels according to the look-up table from the memory.

12. The display apparatus according to claim 11, wherein the central processing unit has a graphics processing unit configured to process the indices as coordinates of a first texture and to retrieve the pixels by sampling the image frame according to the first texture.

13. The display apparatus according to claim 12, wherein the graphics processing unit is configured to process the image frame as a second texture.

14. The display apparatus according to claim 1, wherein the light beam has at least two colours and each pixel comprises a colour value for each of said colours.

15. The display apparatus according to claim 14, wherein the light beam is comprised of mutually spaced partial light beams each of a respective one of said colours, and wherein the central processing unit is configured to determine the sequence of pixels, for each of successive positions within said scan pattern starting from said initial position, by retrieving those pixels of the image frame that are to be displayed by the partial light beams at this position and using the respective colour values of the retrieved pixels for the pixel of the sequence to be displayed at that position.

16. The display apparatus according to claim 14, wherein the light beam has three colours red, green, and blue.

17. The display apparatus according to claim 16, wherein the light beam is comprised of mutually spaced partial light beams each of a respective one of said colours, and wherein the central processing unit is configured to determine the sequence of pixels, for each of successive positions within said scan pattern starting from said initial position, by retrieving those pixels of the image frame that are to be displayed by the partial light beams at this position and using respective colour values of the retrieved pixels for a pixel of the sequence to be displayed at that position.

18. A display apparatus, comprising:

a light source configured to emit a light beam;

a light source driver configured to drive the light source according to pixels of an image frame to be displayed on an image area within a frame duration;

a mirror assembly with one or more mirrors configured to oscillate and deflect the light beam towards the image area according to a scan pattern;

a mirror driver configured to drive the mirror assembly according to said scan pattern;

a buffer connected to the light source driver and the mirror driver and configured to buffer pixels of the image frame and to feed, synchronised by the mirror driver one or more times per frame duration starting from an initial position within the scan pattern, the buffered pixels successively to the light source driver for displaying; and a central processing unit connected to the buffer and configured to hold the image frame in a memory, to determine a sequence of pixels of the image frame to be successively displayed according to said scan pattern starting from said initial position, and to transfer said sequence of pixels in one or more successive segments to the buffer for buffering, wherein the central processing unit is configured to store a look-up table of indices of the pixels to be successively displayed according to said scan pattern and to determine the sequence of pixels by retrieving the pixels according to the look-up table from the memory, wherein the light beam has at least two colours and each pixel comprises a colour value for each of said colours, wherein the light beam is comprised of mutually spaced parallel partial light beams each of a respective one of said colours, and wherein the central processing unit is configured to establish, for each of said colours, a respective offset of the indices of the pixels to be displayed by the partial light beam of that colour from the indices of the look-up table, to write, into each pixel of the image frame, a respective colour value of those pixels of the image frame whose indices are offset by the respective offset from an index of that pixel, and to retrieve the pixels according to the look-up table from the memory.

19. The display apparatus according to claim 18, wherein the light beam has three colours red, green, and blue.

* * * * *